Sept. 15, 1959  P. H. BAÜMANN  2,904,182
FILTERS
Filed Jan. 14, 1957  2 Sheets-Sheet 1

INVENTOR
PAUL H. BAUMANN

ATTY.

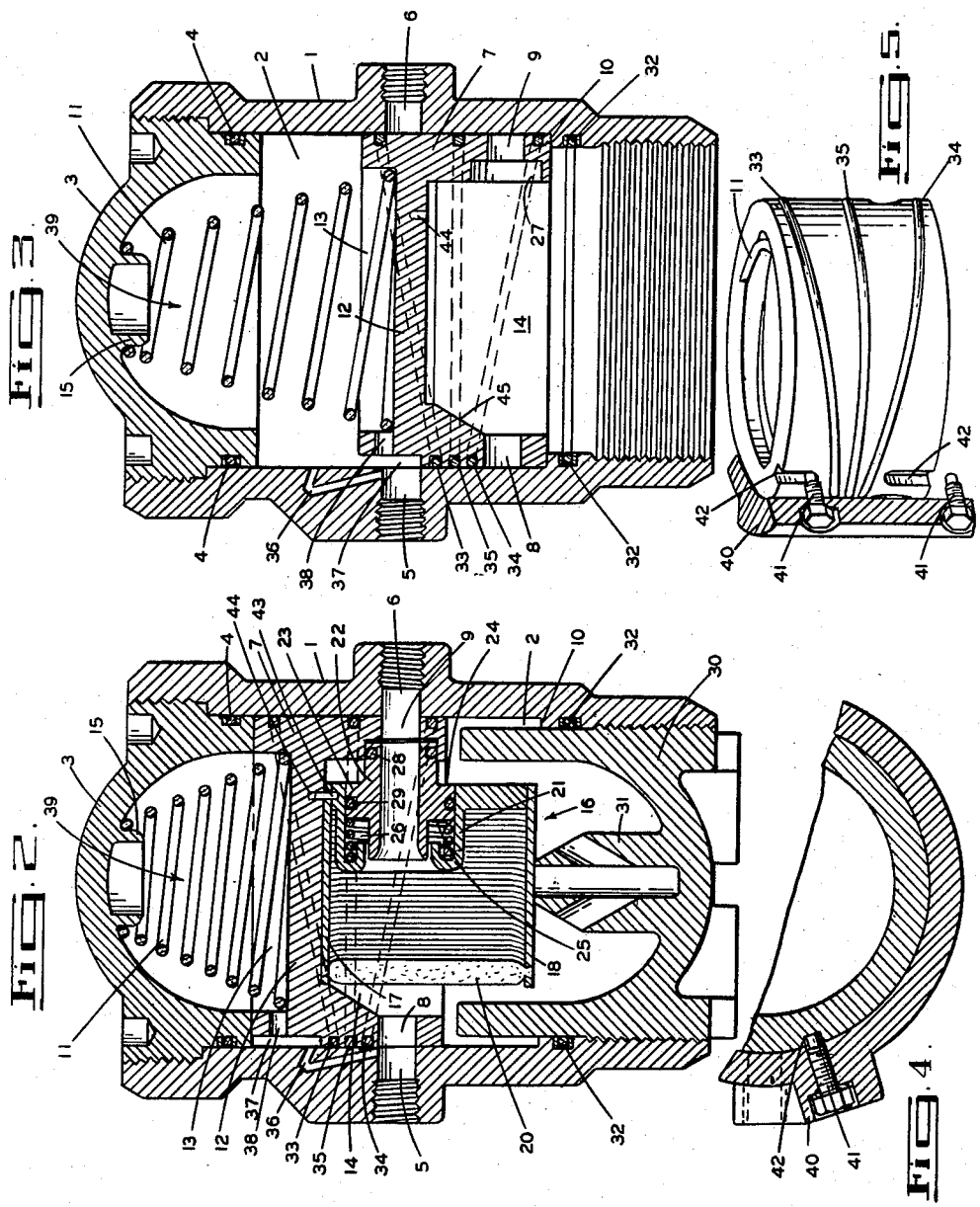

United States Patent Office 2,904,182
Patented Sept. 15, 1959

2,904,182
FILTERS
Poul Hoegh Baümann, Toronto, Ontario, Canada
Application January 14, 1957, Serial No. 633,905
8 Claims. (Cl. 210—234)

This invention relates to improvements in filter units, and particularly to filter units adapted for use in the filtering or cleaning of liquids.

One of the important objects of the invention is to provide a filter unit in which the liquid to be filtered is directed to flow in a straight flow path through the unit between the inlet and outlet passages whereby pressure drop in the filter from change of direction of liquid flow is eliminated.

Another important object is to provide a filter unit in which in the removal of the filtering element for cleaning both the inlet and outlet will be automatically sealed so that there will be substantially no liquid loss on cleaning of the filter element.

Again it is an important object to provide a filter unit having an improved by-pass feature for relieving excess pressures in the unit. In this connection, it is an object to provide a filter unit which will have particular application in high pressure liquid systems, yet will at the same time be highly sensitive to pressure differentials to relieve excess pressures.

Further, it is an object to provide a filter unit as aforesaid which, once having by-passed excess pressures in the filter, will be capable of immediately closing the by-pass so that there will be no excess liquid by-passed.

Still a further object is to provide a filter unit as aforesaid of sturdy and simple construction and which in operation will have all parts rigidly and positively held against accidental displacement.

The principal feature of the invention resides in providing in a housing having aligned inlet and outlet passages, valve means for allowing straight flow through of the liquid between the passages when in the open position and for effecting simultaneous closing of the passages when moved to the closed position, a removable filter element disposed so that when in operative relation to filter a fluid or liquid passing between the inlet and outlet it maintains the valve in the open position and when removed from the housing allows the valve to move to the closed position, and means acting on the valve to automatically move same to the closed position when the filter element is removed.

More particularly according to the invention the valve comprises a hollow cup-like member slidably arranged within the housing beneath a housing dome, the valve having diametrically arranged ports in the wall thereof for cooperation with the corresponding inlet and outlet passages in the housing wall and having an arrangement of sealing rings thereon whereby movement of the valve to bring its passages into and out of registration with the housing inlet and outlet passages allows the opening and effects the sealing respectively, of the passages and the filter element is arranged within the valve and is actuated by a bowl threaded into the housing to force the valve to the open position, the valve being actuated by a spring to the closed position upon unthreading of the bowl and removal of the filter element.

Further according to the invention the filter element embodies a relief valve for by-passing liquid to the housing outlet, the relief valve presenting a surface area differential to the liquid internal and external of the filter element such that the valve remains closed under normal operation of the filter unit and is opened against internal filter element pressure and a restraining spring upon the occurrence of an excess pressure difference between the internal and external liquid. More particularly according to this aspect of the invention, the relief valve is so disposed and arranged that on opening no normally unexposed surface or dead area is presented to the external oil pressure, and thus no increased opening force, which would have to be overcome upon relief of the excess external pressure in order to close the valve, is occasioned.

Another important feature resides in providing a by-pass between the filter inlet and the housing dome whereby upon removal of the bowl and filter element and consequent valve movement, liquid which might otherwise be lost is sucked into the housing dome.

Again it is a feature to so arrange the valve, filter element and bowl so that when the parts are assembled the bowl will positively rigidly secure the filter element and valve in operative position with the valve open.

These and other objects and features of the invention will become apparent from the following description taken in conjunction with the accompanying drawings, in which:

Figure 2 is a mid-vertical sectional view on an enlarged scale with the parts assembled;

Figure 3 is a view similar to Figure 2, but with the filter bowl and filter element removed;

Figure 4 is a fragmentary horizontal sectional detail showing the pin and groove arrangement for maintaining the sleeve valve against rotation;

Figure 5 is a fragmentary part-vertical sectional part perspective view illustrating the relationship between the sleeve valve and housing pin for allowing sliding movement of the sleeve valve while maintaining it from rotation.

Figure 1:
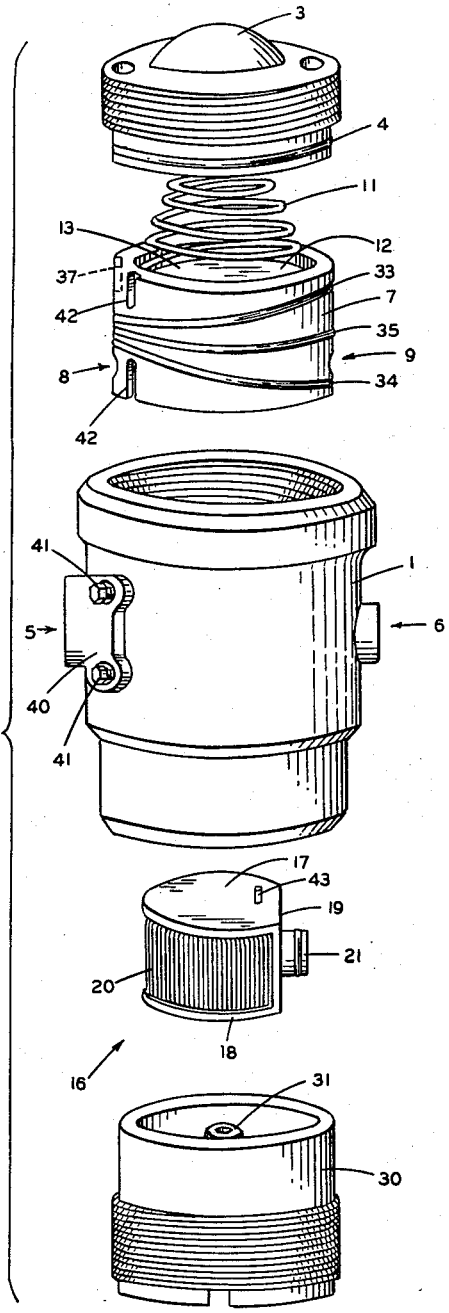
Figure 1 is an exploded perspective view of a filter unit constructed to embody the invention.

With reference particularly to Figures 2 and 3, the filter unit comprises a housing 1 shown of cylindrical form having a cylindrical bore 2 therein closed at the upper end by a domed closure 3 threaded into an enlargement of the bore 2. A suitable O- or sealing ring 4 affords a liquid tight seal with the bore 2.

Intermediate of its heighth, the housing 1 is provided with a pair of axially aligned diametrically opposed passages adapted to comprise an inlet passage 5 and an outlet passage 6, the axes of these passages being perpendicular to the axis of the bore 2. Slidably mounted in the bore 2 is a cylindrical or sleeve valve 7 having a pair of diametrically opposed axially aligned ports 8 and 9 in the wall thereof adapted to form inlet and outlet ports respectively.

The sleeve valve is movable axially of the bore 2 between an upper open position as shown in Figure 2, with the ports 8 and 9 in registration with the inlet and outlet passages 5 and 6, respectively, and a lower or closed position as illustrated in Figure 3 with the ports 8 and 9 out of registration with the inlet and outlet passages 5 and 6. The domed closure 3 provides a means for limiting the upward movement of the valve 7 with the valve in the open position. An internal shoulder 10 limits the downward movement of the valve 7 with the valve in the closed position of Figure 3 and takes up the working liquid pressure when the bowl is out.

A spring 11 bearing between the domed member 3 and a partition 12, dividing the valve 7 into an upper spring receiving well 13 and a lower filter element receiving well 14, acts to urge the valve to the closed position. An internal hollow circular boss 15 formed on the inner surface of the domed closure 3 serves to centre the spring 13.

As shown in Figure 2, received within the lower well 14 is a filter element generally designated at 16 and this filter element is shown as particularly seen in Figures 1 and 2 as comprising spaced bottom and top walls 17 and 18 respectively of rigid material connected by a flat vertical wall section 19. The remainder of the vertical or peripheral wall 20 comprises a suitable filtering media, the walls 17, 18, 19 and 20 defining a chamber.

The wall 19 is provided with a tubular guideway 21 projecting internally of the filter chamber and slidably mounted in the guideway 21 is a tubular member 22 having an enlarged flange 23 intermediate of its length presenting annular shoulders 24 and 25 exposed respectively to the exterior and interior of the filter chamber defined by the filter walls. A spring 26 acts to urge the tubular member 22 outwardly of the filter chamber.

The outlet port 9 of the valve 7 is enlarged as at 27 at the interior of the valve and the outer end of the tubular member 22 under action of the spring 26 is adapted to enter the enlarged port portion as illustrated in Figure 2.

Suitable seals 28 and 29 provide a seal between the outer end of the tubular member 22 and the enlarged port section 27 and the flange formation 23 of the tubular member and the tubular guideway 21. Thus, with the filter element 16 in the position shown in Figure 2 having the tubular member 22 fitting into the enlarged port portion 27, the outlet port 9 of the valve 7, and, consequently, the outlet passage 6 are in communication with the interior of the filter chamber, but are sealed against communication with the interior of the housing 1 or sleeve valve 7.

The filter element 16 is held in the position of Figure 2 by means of a removable bowl 30, forming a sediment reservoir, threaded into the lower end of the housing 1, the bowl carrying a central tubular projection 31 on the inside thereof engaging the filter element 16 and clamping it firmly against the partition 12 of the valve which is fixed in the open limit position by the domed closure 3. Thus, the bowl 30, when threaded into the housing 1 as illustrated in Figure 2, serves to clamp the parts in assembled relation to prevent loosening under vibration. An O- or sealing ring 32 provides a liquid tight seal around the bowl 30.

Provided on the sleeve valve 7 are a pair of oppositely inclined O- or sealing rings 33 and 34 which extend, the one diagonally upwardly from the left hand side of the valve as seen in Figure 2, and the other diagonally downwardly from the left hand side of the valve. The lower ring 34 is so disposed, as illustrated in Figure 2, that with the valve 7 in the open position, it extends from a point immediately above the inlet passage 5 and inlet port 8 to a point immediately below the outlet passage 6 and the outlet port 9. Thus, this ring prevents pressure liquid or fluid from entering the inlet passage 5 and flowing upwardly between the valve 7 and the inner surface of the housing 1, and it also prevents pressure liquid or fluid from flowing upwardly from beneath the outlet 6 between the valve and housing at the outlet side of the valve.

The upper sealing ring 33 is so disposed, as illustrated in Figure 3, that with the valve 7 in the closed position liquid or fluid flow is prevented from occurring downwardly from the inlet passage 5 between the valve 7 and the housing wall, and at the same time, liquid or fluid flow is prevented from occurring upwardly from the outlet passage 6 between the exterior of the valve 7 and the housing wall.

A third sealing ring or O-ring 35 is arranged between the sealing rings 33 and 34, and this third ring 35 serves the function of preventing liquid or fluid flow where the outlet passage 6 is connected to a high pressure system back downwardly between the exterior wall of the valve 7 and the interior wall of the housing 1 into the open lower end of the housing which is opened by removal of the bowl 30 for removal of the filter element for cleaning, and collected sediment.

As illustrated in Figures 2 and 3, the housing 1 is provided with a by-pass bore 36 providing communication between the inlet passage 5 and the housing above the sealing rings 33, 34 and 35 and the outer surface of the valve 7 is grooved as at 37 to provide communication through the groove and through a port 38 with the chamber 39 formed between the inner face of the domed closure 3 and the valve partition 12.

As illustrated particularly in Figures 4 and 5 the housing 1 is provided with a threaded boss formation 40 receiving threaded guide pins or bolts 41 which operate in grooves 42 formed in the peripheral surface of the valve 7 to prevent the valve from turning in the housing and moving the ports 8 and 9 out of registration with the passages 5 and 6. A locating pin 43 carried by the filter element 16 engages in a mating bore 44 to locate the filter element in correct position in the valve 7 so that the tubular member 22 registers with the outlet passage 6 and the valve outlet port 9. Preferably, the inner wall of the sleeve valve 7 is bevelled as at 45 to facilitate the location of the filter element.

In operation, the assembled parts are held rigidly by the clamping action of the bowl 30 on the filter element 16 and the liquid such as oil or other fluid is directed into the filter unit through the inlet passage 5, then through the filtering medium 20 to the interior of the filter element, then through the tubular member 22 to the outlet 6, the valve ports 8 and 9 registering with the passages 5 and 6 and forming continuations thereof.

The valve is particularly adapted for use in a high pressure system, and it is a particular feature of the valve that the liquid or fluid flow comprises a straight line flow in passing from the inlet through the filter to the outlet and the liquid is not required to change direction such as occurs in conventional filter units, and as a result the pressure drop in the unit is maintained to a minimum.

Again the filter unit lends itself to high pressure systems since there is no valve seat with a dead area in respect of the by-pass valve arrangement as hereinafter more fully explained. Further the valving provided by the sleeve valve 7 allows sealing against high pressures by virtue of the sealing ring arrangement without requiring close tolerances of the valve parts as fully explained in my co-pending application, Serial No. 633,940.

During the filtering operation, the by-pass bore 36, groove 37 and port 38 allow the liquid or fluid to enter the chamber 39 thereby always creating equal pressure above and below the sleeve valve 7. The inclined or diagonal sealing ring 34 prevents a by-pass of the liquid from the interior of the housing beneath the partition 12 to the outlet 6.

Under normal operating conditions the external pressure within the housing acts on shoulder 24, the difference in area between sealing rings 28 and 29, to retract the tubular member or valve 22. Opposing this force is the internal filter element pressure acting on the same area together with the force of the spring 26. In this connection it will be understood that the area on each end of the tubular member or valve 22 within the periphery of the sealing ring 28 is under the same pressure, i.e. internal filter element pressure, and the pressure being directed in opposite directions provides zero opening or closing pressure. The remainder of the area between the peripheries of the sealing rings 28 and 29, is, on the inside of the filter element, acted upon by the internal filter element pressure while the same area on the outside of the filter element is acted upon by the external or housing pressure. This latter area remains constant whether the valve is open or closed as there is no dead area in the valve such as occurs in conventional valves.

In conventional valves with a valve seat, the differential area, say of 1 square inch, presented by the valve when closed is subjected to the working pressure, e.g. 3000 p.s.i. in a high pressure system. On opening at, for instance, 50 p.s.i. over pressure, the valve seat of, for instance, ¼ square inch area which when closed has been subjected to 0 pressure on opening is subjected not only to the 50 p.s.i. over pressure but also to the 3000 p.s.i. working pressure which means that its spring to reclose the valve must exert not only ¼ of the 50 p.s.i. but also ¼ of the 3000 p.s.i., that is 762½ p.s.i., which would not allow opening of the valve in the first instance against 50 p.s.i.

Thus, the by-pass valve arrangement provided by the tubular member 22 affords a means of rendering the filter unit sensitive to small internal-external pressure differentials with high working pressures while at the same time ensuring that no excess of liquid or fluid is by-passed.

When it is desired to clean the filter element the bowl 30 is unscrewed from the housing 1 and during this operation the spring 11 acts on the valve 7 to force same downwardly simultaneously closing the inlet and outlet passages 5 and 6. It will be understood that because of the provision of the pressure balancing by-pass 36, 37 and 38 leading to chamber 39 above the valve, the spring 11 will not have to overcome the fluid pressure below the valve. Following removal of the bowl, the filter element is removed and cleaned. The loss of liquid or fluid from the system is very little in the cleaning operation because of the automatic and simultaneous closing of the inlet and outlet passages and further because during the unthreading of the bowl and the downward movement of the valve 7 the chamber 39 will be increased creating a partial vacuum in this chamber which sucks up the liquid from the lower part of the housing through the bore 36, groove 37 and port 38 into the increasing chamber. This arrangement again minimizes the amount of oil loss when cleaning is being effected. In the closed position, the upper sealing ring 33 and the intermediate sealing ring 35 seal the high pressure liquid in communication with the inlet and outlet passages from communication through the filter unit either above the valve 7 or through the valve ports 8 and 9.

By having the closure member 3 domed and by forming the closure member 30 as a bowl with spherical surfaces, a uniform pressure distribution on these closure members is obtained, enabling the use of the unit in high pressure systems.

It will be noted that the unit is extremely simple, and the incorporation of the safety or the by-pass valve in the filter element which in turn is received within the sleeve valve 7 provides for a very compact filter unit.

It will be noted that the guide pins or screws 41 operating in the valve grooves 42 prevent turning of the valve 7, and also prevent upward removal of the valve through the top of the housing thus holding the valve in its assembled position. However, retraction of the upper screw or pin, as seen in Figure 5, clearing it from the upper groove 42, will allow removal of the valve 7 for replacement or renewal of the rings 33, 34 and 35.

In this connection, the rings 33, 34 and 35 may simply be the conventional O-rings, but it will be understood that sealing rings of other configuration and mounted in various ways for instance by being swaged or clamped in the grooves to withstand blow-out under pressures according to conventional practice may be employed.

It will also be understood that various modifications in detail and in the arrangement of the parts may be made within the spirit of the invention and the scope of the appended claims.

What I claim as my invention is:

1. A filter unit comprising a housing having a cylindrical chamber therein, and an inlet passage leading radially to and an outlet passage leading radially from said chamber, the axes of said inlet and outlet passages lying in a common plane perpendicular to the axis of said chamber, a sleeve valve slidably arranged in said chamber to slide axially thereof and having ports in the wall thereof adapted to move into and out of register with said inlet and outlet passages on sliding of said valve between an open and a closed position, spring means urging said valve to the closed position, a removable filter element disposed within said sleeve between said inlet and outlet passages, a removable closure for said chamber, means carried by said closure for effecting displacement of said valve to the open position against the action of said spring when said filter element is in position and said closure member is in chamber closing position, and relief valve means for by-passing said filter element under excess pressure conditions, said sleeve valve being a loose sliding fit in said cylindrical chamber, and being provided with an arrangement of sealing rings on its external surface disposed and arranged to seal said inlet passage from communication around the periphery of said sleeve valve with said outlet passage when said sleeve valve is in either the open or closed positions.

2. A filter unit as claimed in claim 1 in which said arrangement of sealing rings comprises a first diagonally disposed ring extending peripherally around the sleeve valve from above the inlet passage to below the outlet passage with said sleeve valve open, and a second diagonally disposed sealing ring extending from below said inlet passage to above said outlet passage with said sleeve valve in the closed position.

3. A filter unit as claimed in claim 2 in which a further sealing ring is provided extending peripherally around said sleeve valve between the aforesaid diagonally disposed sealing rings and arranged to seal said ports from said inlet and outlet passages with said sleeve valve in the closed position.

4. A filter unit comprising a housing having a cylindrical bore therein and having diametrically opposed axially aligned inlet and outlet passages in the wall thereof, the axes of said passages being perpendicular to the axis of said cylindrical bore, a sleeve valve member slidably mounted in said bore and having diametrically opposed axially aligned ports in the wall thereof adapted to move into and out of register with said inlet and outlet passages on sliding movement of said valve, means to limit movement of the valve in one direction with said ports in registration with said passages, spring means urging said valve from port and passage registration, said valve having a partition defining at the side of said partition remote from said limit means a well in communication with said ports and adapted to receive a filter element, a removable filter element arranged in said well and comprising a chamber having at least one wall formed at least in part of a filtering medium and an outlet from said chamber in communication with the valve port adapted to register with said outlet passage and normally sealed from communication with the interior of said well, and a removable closure member for said cylindrical bore disposed to face said filter well and adapted to secure said filter element in said filter well and to effect displacement of said valve to the open limit position when in bore closing position and to release said filter element for removal from said well and bore and said valve for actuation by said spring means from the open position to a closed position simultaneously closing said inlet and outlet passages, said valve having an arrangement of sealing rings disposed in the periphery thereof and inclined to the bore axis whereby with the valve in the open position one sealing ring extends diagonally from a point on the side of the inlet passage remote from the mouth of the filter well to a point on the opposite side of the outlet passage next adjacent to the mouth of the filter well, and with the valve in the closed position another sealing ring extends diagonally between points on opposite sides of the inlet and outlet passages with said latter points being on opposite sides of the passage axes from the aforesaid points from which said first sealing ring extends with said valve in the open position.

5. A filter unit as claimed in claim 4 in which said means for limiting movement of said valve comprises a domed member for closing the end of said bore opposite to the end closed by the aforesaid closure member, said housing and valve being formed to provide a flow by-pass between said inlet passage and said domed member with said valve in the open position, said flow by-pass providing for flow into said bore between said domed member and valve as said valve is moved by said spring to the closed position on removal of said removable closure member.

6. A filter unit as claimed in claim 4 in which the outlet of said filter element comprises an axially slidable tubular member carried by said filter element and communicating with the interior thereof, means locating said filter element relative to said sleeve valve with said tubular member in axial alignment with the outle port of said sleeve valve, said tubular member being adapted to move into and out of said outlet port when in registration therewith, and spring means urging said tubular member outwardly of said filter element and into said outlet port, and means locating said filter element relative to said sleeve valve, said tubular member having an arrangement of shoulders presenting the same surface area to pressures internally and externally of said filter element and having no dead area whereby upon excess external pressure said tubular member is adapted to be retracted from said outlet port against the action of said spring means acting thereon to by-pass flow from said filter well to said outlet port.

7. A filter unit as claimed in claim 4 in which said sleeve valve carries a third sealing ring concentric therewith and disposed with said sleeve valve in the open position on the sides of said inlet and outlet passages adjacent to the end of said bore adapted to be closed by said removable closure member.

8. A filter unit as claimed in claim 4 in which said removable closure member comprises a threaded bowl member threadably engaging said housing and having means engaging said filter element to clamp same against said sleeve valve partition with the filter element and bowl assembled with said housing, and means are provided to locate said sleeve valve and filter element against rotation on rotational movement of said bowl.

References Cited in the file of this patent

UNITED STATES PATENTS

| | | |
|---|---|---|
| 922,657 | Worsey | May 25, 1909 |
| 2,423,329 | Le Clair | July 1, 1947 |
| 2,430,578 | Matlock | Nov. 11, 1947 |
| 2,431,782 | Walton | Dec. 2, 1947 |
| 2,533,266 | Kovacs | Dec. 12, 1950 |
| 2,544,244 | Vokes | Mar. 6, 1951 |
| 2,793,752 | Jay | May 28, 1957 |